United States Patent [19]

Mueller

[11] 4,402,080
[45] Aug. 30, 1983

[54] SYNCHRONIZING DEVICE FOR A TIME DIVISION MULTIPLEX SYSTEM

[75] Inventor: Horst Mueller, Hohenschaeftlarn, Fed. Rep. of Germany

[73] Assignee: Siemens Aktiengesellschaft, Berlin & Munich, Fed. Rep. of Germany

[21] Appl. No.: 254,059

[22] Filed: Apr. 14, 1981

[30] Foreign Application Priority Data

May 19, 1980 [DE] Fed. Rep. of Germany ....... 3019078

[51] Int. Cl.³ .............................................. H04J 3/06
[52] U.S. Cl. .................................... 370/100; 375/116
[58] Field of Search ................ 370/100, 106; 375/116

[56] References Cited

U.S. PATENT DOCUMENTS

| | | | |
|---|---|---|---|
| 4,045,618 | 8/1977 | Lagarde et al. | 370/100 |
| 4,121,057 | 10/1978 | Luder | 370/100 |
| 4,340,962 | 7/1982 | Wintzer | 375/116 |

FOREIGN PATENT DOCUMENTS 2814000 10/1979 Fed. Rep. of Germany.

Primary Examiner—Douglas W. Olms
Attorney, Agent, or Firm—Hill, Van Santen, Steadman & Simpson

[57] ABSTRACT

In a synchronizing device for a TDM system which operates at a high speed, in order to be able to use a slower, energy-saving circuit technique, in the event of n possible phase positions, the TDM signal is split between n parallel shift registers. The outputs of the shift registers are connected to a frame code word recognition circuit. During a synchronization process, the slower-operating clock pulse train of the shift registers is delayed by the period of the received clock pulse train. As a result, the next possible phase position is checked. This procedure is repeated until the frame code word recognition circuit emits a synchronization signal.

4 Claims, 4 Drawing Figures

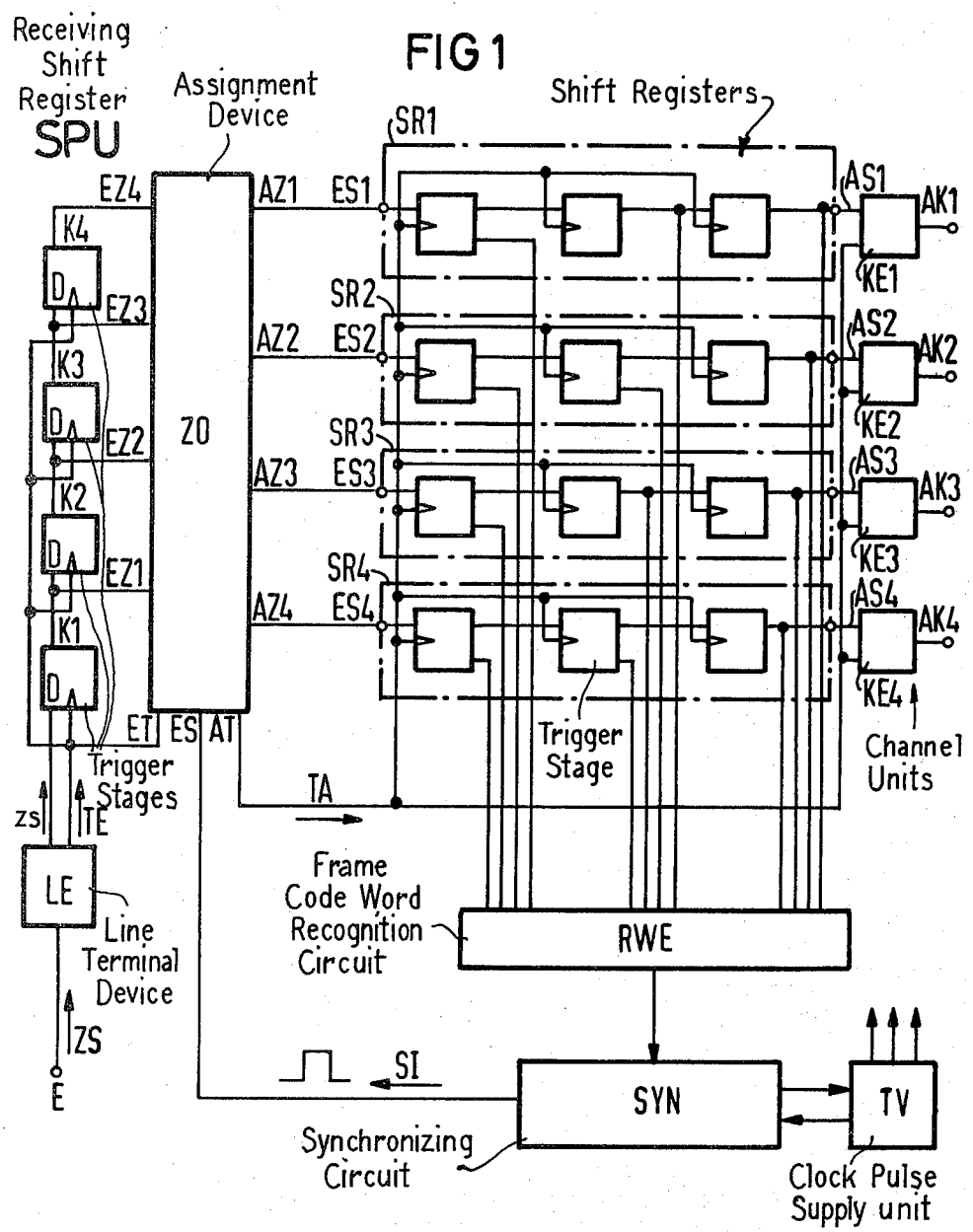

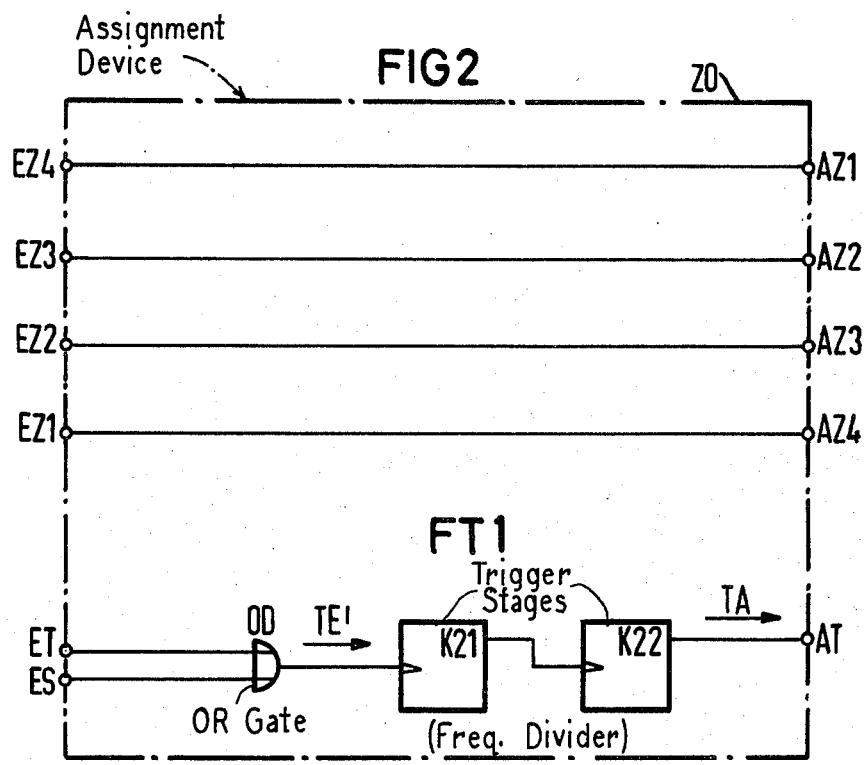
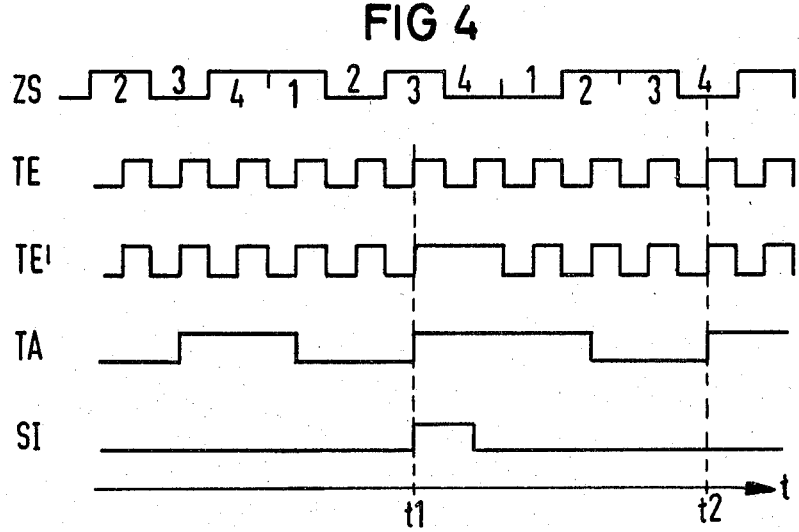

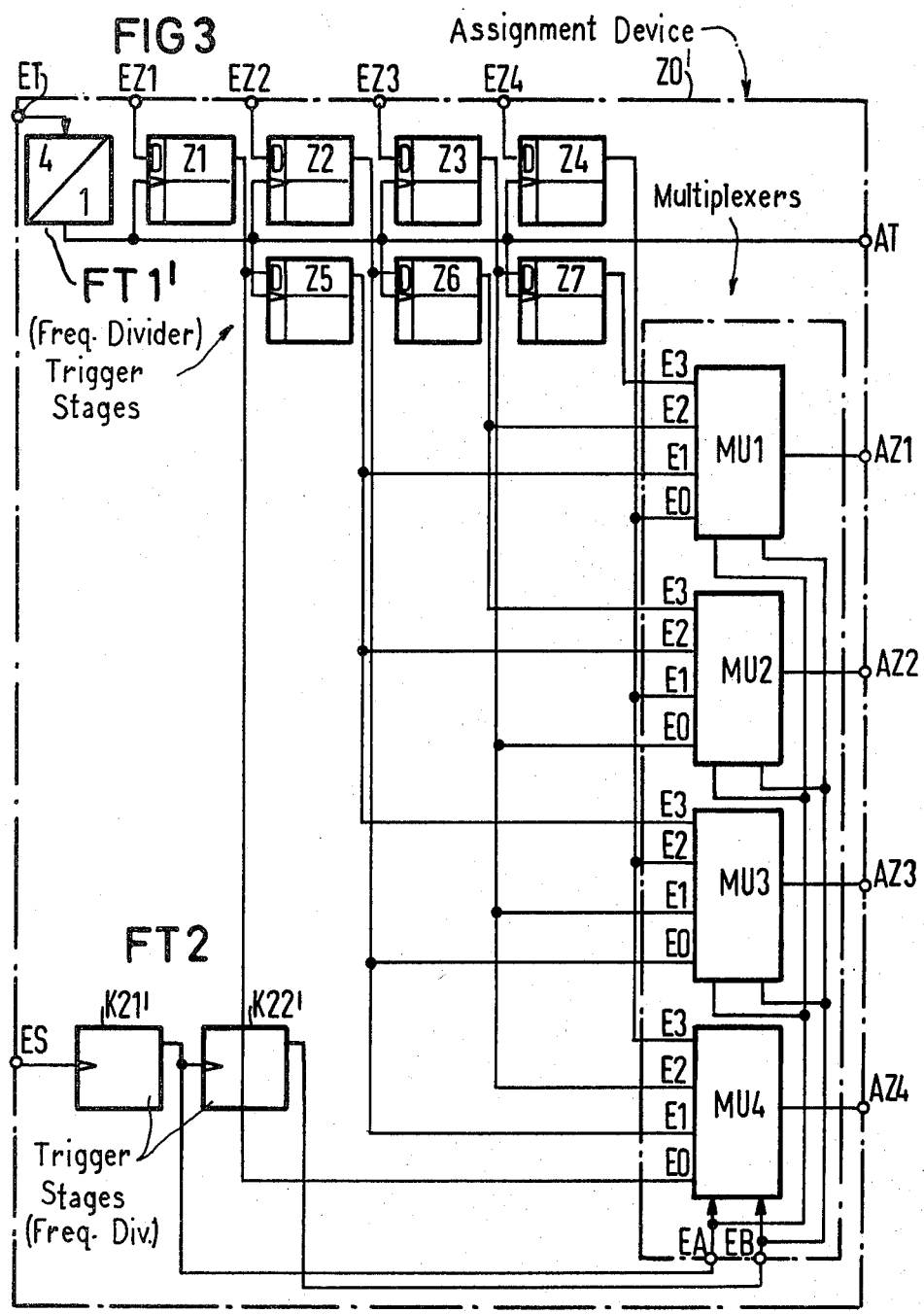

SYNCHRONIZING DEVICE FOR A TIME DIVISION MULTIPLEX SYSTEM

BACKGROUND OF THE INVENTION

1. Field of the Invention

The present invention relates to a synchronizing device for a time division multiplex (TDM) system comprising a receiving shift register as a series-parallel converter whose input is supplied with a TDM signal, a frame code word recognition circuit and a synchronizing circuit.

2. Description of the Prior Art

In a high-speed TDM system, the transmission rate amounts, for example, to 565 Mbits per second. At these transmission speeds, it is necessary to use an extremely rapid switching circuit logic. The current consumption is equally high. The German allowed and published application No. 28 14 000 discloses a multiplex arrangement having a synchronizing device wherein the extent of the high-speed and power-intensive circuit components has been kept as small as possible.

For TDM systems of even high speeds, the power-intensive logic component is still too high, however, and more complex, sufficiently high-speed logic circuits are not available or can be constructed only with difficulty.

SUMMARY OF THE INVENTION

Therefore, the object of the invention is to provide a synchronizing device for TDM systems wherein as small as possible a portion of the circuit is constructed by a high-speed and, therefore, power-intensive logic.

The above object is realized in that with n possible phases and a $k \cdot n = 1$ bits long frame code word, the receiving shift register contains n trigger stages, that the digital signal inputs of n shift registers each comprising k trigger stages are connected by way of an assignment device to the output of the trigger stages of the receiving shift register, that the assignment device contains a frequency divider which is operated by a receiving clock pulse train and which possesses a division ratio of n:1 and whose output is connected to the clock pulse inputs of the shift registers, that the inputs of the frame code word recognition circuit are connected to the outputs of the trigger stages of the shift registers, and that the output of the frame code word recognition circuit is connected to the synchronizing circuit which, via the assignment circuit, changes the phase position of the bits which have been input into the shift registers relative to the TDM signal.

An advantage of the synchronizing device is that only the receiving shift register operates with the highest clock pulse speed. The length of the receiving shift register corresponds to the number of possible phase positions. Apart from one or two trigger stages, the entire synchronizing circuit operates with a clock pulse frequency which is reduced by the factor n.

It is advantageous that the assignment device contains a controllable frequency divider whose clock pulse input is preceded by an OR gate, that a first input of the OR gate is supplied with the receiving clock pulse train from an input circuit, that a second input of the OR gate is supplied with a synchronizing pulse from the synchronizing circuit which in each case deactivates a receiving clock pulse train, that the output of the frequency divider is connected to the clock pulse output of the assignment circuit, and that an input EZ1—EZn of the assignment device is in each case directly connected to an output AZn—AZ1 of the assignment device.

This realization is particularly advantageous as it requires only a minimal expense. Synchronization of the TDM system is achieved in that the phase of the system clock pulse trains is displaced by one received clock pulse during each synchronizing process. It is basically possible for a received clock pulse to be gated in or out; however, because of the high speed, in practice, only gating out will take place.

Another advantageous development of the invention is that an assignment device of different design is provided with a frequency divider having a division ratio of n:1, whose output is connected to the clock pulse input of the assignment circuit, that a first group comprising n trigger stages is provided whose digital signal inputs are connected to the outputs of the trigger stages of the receiving shift register, that a second group $n-1$ trigger stages $Z(n+1)—Z(2n-1)$ is provided, that the digital signal inputs of this second group of trigger stages are connected to the outputs of the first to the $(n-1)^{th}$ trigger stage of the first group, that the outputs of the trigger stages of the first and second groups are connected to the relevant inputs of the multiplexers in such a manner that the outputs of the trigger stages $Z(1+m)—Z(n+m)$ where $m = 0, 1, 2 \ldots n-1$) are in each case connected to the outputs $E0—E(n-1)$ of each multiplexer $MU(n-m)$, and thus the outputs of the multiplexers display n possible bit combinations corresponding to n possible phase positions, and that a further frequency divider having a division ratio of n:1 is provided whose outputs are connected to the address inputs of the multiplexers.

This realization has the advantage that the system clock pulse trains remain unchanged. In the event of a synchronizing process, in this manner, switch-through in each case takes place to the frame code word recognition circuit.

BRIEF DESCRIPTION OF THE DRAWINGS

Other objects, features and advantages of the invention, its organization, construction and operation will be best understood from the following detailed description, taken in conjunction with the accompanying drawings on which:

FIG. 1 is a schematic illustration of an exemplary embodiment of the invention illustrating the principle of the synchronizing device;

FIG. 2 is a schematic illustration illustrating an exemplary embodiment of the assignment device;

FIG. 3 is a schematic representation of a further exemplary embodiment of the assignment device; and FIG. 4 is a graphic illustration of a pulse diagram of the synchronizing device.

DESCRIPTION OF THE PREFERRED EMBODIMENTS

FIG. 1 illustrates a synchronizing device for a TDM system comprising four channels. The TDM signal ZS is fed via an input E to a line terminal device LE. The line terminal device LE contains a step synchronizing device in which the received clock pulse train TE is obtained from the received TDM signal ZS. The line terminal device LE can likewise contain a code converter which, however, is not essential to the invention. The received clock pulse train TE obtained in the line terminal device and the digital TDM signal ZS are fed to a receiving shift register SPU which operates as a series-parallel converter and which contains four trigger stages K1—K4. The outputs of the four trigger stages K1—K4 are connected to four inputs EZ1—EZ4 of an assignment device Z0. Therefore, the output of the first trigger stage K1 is connected to the input EZ1, the output of the last trigger stage K4 of the shift register is connected to the input EZ4. Likewise, the received clock pulse train TE is fed to an input ET of the assignment device Z0. Four outputs AZ1—AZ4 of the assignment device Z0 are each connected to a digital signal input ES1—ES4 of four shift registers SR1—SR4 each having three trigger stages. The outputs AS-1—AS4 of the shift registers SR1—SR4 lead to inputs of four channel units KE1—KE4. The outputs of the four channel units are referenced AK1—AK4. The outputs of the trigger stages of the shift registers SR1—SR4 are connected to a frame code word recognition circuit RWE. Depending upon the frame code word, these can be the noninverted or the inverted outputs of the trigger stages of the shift registers. The frame code word recognition circuit RWE contains gate circuits, under the simplest circumstances an AND gate or OR gate. The output of the frame code word recognition circuit RWE is connected to an input of a synchronizing circuit SYN. A first output of the synchronizing circuit is connected to a first input of a clock pulse supply unit TV. A further output of the synchronizing circuit SYN is connected to a synchronizing input ES of the assignment device Z0. The clock pulse output AT of the assignment device is connected to the four clock pulse inputs of the shift registers SR1—SR4 and to the clock pulse inputs of the channel devices KE1—KE4. The clock pulse supply unit emits a plurality of operating clock pulses, e.g. for the line terminal device or the channel devices. This is indicated by arrows.

The assignment device Z0 which is illustrated in FIG. 2 contains two trigger stages K21 and K22 which are connected as four-element dividers FT1. The first trigger stage K21 is supplied with the received clock pulse train via a first input ET of an OR gate OD, whereas the second input of the OR gate corresponds to the synchronizing input ES. One output of the second trigger stage K22 corresponds to the clock pulse output AT. The four inputs EZ1—EZ4 are each connected to the outputs AZ4—AZ1. The cyclic exchange of the designation (4 to 1, 3 to 2, etc) results in a time-correct assignment between the designation and the received bits. The first bit to be received is presented at the output AZ1 of the assignment device.

The operation of the synchronizing device will be explained in the form of a pulse diagram (FIG. 4). The TDM signal ZS is input into the shift register SPU with the highspeed received clock pulse train TE. The TDM signal ZS contains a specific bit combination, the frame code word. In each case, after four received clock pulses, the bits present at the outputs of the trigger stages K4—K1 of the shift register SPU are each transferred in parallel into the first trigger stage of the four shift registers SR1—SR4 with a clock pulse train TA which is slower by the factor 4. In each case, following four further clock pulses TE, this process is repeated. When a frame code word has been received in the correct phase position, the first four bits of the frame code word are present at the outputs of the shift registers SR1—SR4. The four further bits of the frame code word are present at the second trigger stages of the shift registers, whereas the last four bits of the frame code word, which in this example has a length of 12 bits, are present at the outputs of the first trigger stages of the shift registers. In the event of a frame code word, the frame code word recognition circuit RWE emits a pulse which signals the state "in phase" to the synchronization unit SYN. If the frame code word fails to appear for the duration of a frame period of more than one frame period of the multiplex signal, a synchronization process is initiated. At a time t1, the synchronizing circuit SYN emits a synchronizing pulse SI which has a duration of one period of the received clock pulse train TE and which, having been fed to the input ES of the OR gate OD, maintains the output of the OR gate at a logic "1"—this clock pulse train being referenced TE'—and thereby gates out one pulse from the received clock pulse train TE. The clock pulse train TA emitted from the output AT of the assignment device is similarly displaced by one period of the received clock pulse train TE (t2). Now, those bits of the TDM signal which have been displaced by one pulse of the received clock pulse train TE are transferred into the shift registers SR1—SR4 and are checked in respect of correct phase position. At the latest following three synchronization processes, the correct phase position has been achieved and the synchronization process is at an end.

FIG. 3 illustrates a further exemplary embodiment of an assignment device Z0'. The device comprises four D trigger stages Z1—Z4 whose digital signal inputs D are connected to the points EZ1—EZ4 such that the digital signal input D of the trigger stage Z1 is connected to the input EZ1, the digital signal input D of the trigger stage Z2 is connected to the input EZ2, the digital signal input D of the trigger stage Z3 is connected to the input EZ3 and the digital signal input of the fourth trigger stage Z4 is connected to the input EZ4. The outputs of the trigger stages Z1—Z3 are connected to respective digital signal inputs of trigger stages Z5—Z7. All of the trigger stages Z1—Z4 and Z5—Z7 receive their clock pulse train from a frequency divider FT1' whose input is connected to the clock pulse input ET. The output of the four-element divider FT1', again, is connected to the clock pulse output AT. The outputs of the trigger stages Z1—Z4 and the outputs of the trigger stages Z5—Z7 are connected to the relevant inputs E0—E3 of four multiplexers MU1—MU4 in such a manner that at their outputs AZ1—AZ4 the multiplexers again each emit one of the four possible bit combinations which correspond to the four phase positions. The control inputs EA and EB of the multiplexers MU1—MU4 are connected to the outputs of two trigger stages K21' and K22' which are connected as binary dividers. The lowest value input EA of the multiplexers is connected to the output of the first trigger stage K21' of the frequency divider FT2. The clock pulse input of this trigger stage is connected to the synchronizing input ES.

The assignment device Z0' fulfills the same function as the assignment device Z0. In the event of a synchronization process, the synchronizing pulse SI is fed to the clock pulse input ES of the first trigger stage K21' and as a result of the triggering of this trigger stage and possibly also of the following trigger stage K22' a change occurs in the addressing of the multiplexers MU1—MU4 and the TDM signal ZS is forwarded in a new phase position to the shift registers SR1—SR4. Otherwise, the mode of operation of the synchronizing device has remained the same.

The entire synchronization time is composed of the holding time, the pull-in time and the test time. In this exemplary embodiment, the holding time amounts to four frame periods of the TDM signal ZS. If no frame code word has been received within these four periods, the actual synchronization process is initiated. The pull-in time until synchronization is established has been extended by a maximum of three frame periods in contrast to an optimum high-speed synchronization process. Here, one is assuming the unfavorable situation that the TDM system has, by error, fallen out of phase due to disturbances in the TDM signals ZS. Then, the frame code word must be investigated in the four possible phase positions. There follows a so-called test time of two frame periods during which the frame code word must be received correctly on a further two occasions.

The overall synchronization time has been extended by a maximum of three frame periods in comparison to an optimum high-speed synchronization device; this corresponds to approximately 40%. However, the overall synchronization time remains below the holding time of one of the four subsidiary systems (KE1—KE4).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A synchronizing device for a time-division multiplex system which operates with n possible phase positions and a frame codeword having a length of $l=k\cdot n$ bits, comprising:
input means including an input for receiving a time-division multiplex signal and first and second outputs, said input means operable to derive input clock signals from the received signal, said first output carrying the received signal and said second output carrying the input clock signals; a series-parallel converter including first and second inputs respectively connected to said first and second outputs of said input means, a receiving shift register including n stages and a plurality of outputs for providing serially-received bits as parallel bits;
a plurality of shift registers each including a digital signal input, a trigger input, and k stages having a plurality of outputs and operable to store a frame code word at its output;
a frame code word recognition device including a plurality of inputs connected to said outputs of said stages of said plurality of shift registers, an output, and operable to recognize a stored frame codeword to produce a recognition signal at its output;
a synchronizing circuit including an input connected to said output of said frame codeword recognition circuit device and an output and operable to produce a synchronizing pulse in response to said recognition signal; and
an assignment device for assigning the parallel bits to said plurality of shift registers, said assignment device including a plurality of inputs connected to said outputs of said series-parallel converter, a plurality of outputs connected to said data signal inputs of said shift registers, means assigning said inputs to said outputs, a trigger output connected to said trigger inputs of said plurality of shift registers, a synchronizing input connected to said output of said synchronizing circuit, a clock signal input connected to said second output of said input means, and means operable to derive trigger signals including a n:1 frequency divider including an input connected to said synchronizing input, another input connected to said clock signal input and an output connected to said trigger output.

2. The synchronizing device of claim 1, wherein said means assigning said inputs to said outputs in said assignment device comprises respective direct connections therebetween, said frequency divider includes an input and an output connected to said trigger output, and further comprising:
an OR gate including an output connected to said input of said frequency divider, a first input connected to said second output of said input means and a second input connected to said output of said synchronizing circuit.

3. The synchronizing device of claim 1, wherein said assignment device comprises:
an additional n:1 frequency divider including an input connected to said second output of said input means to divide the input clock signal, and an output;
a first group of n trigger stages each including a digital signal input connected to a respective output of said series-parallel converter, an output and a trigger input connected to said output of said additional frequency divider;
a second group of (n−1) trigger stages each including a trigger input connected to said output of said frequency divider, a digital signal input connected to a respective output of the first to $(n-1)^{th}$ trigger stages of the first group;
a plurality of n multiplexers each including a plurality of inputs respectively connected to said outputs of said second group of trigger stages and the $n^{th}$ trigger stage of said first group, an output, and a pair of address inputs connected to said frequency divider.

4. The synchronizing device of claim 1, wherein said assignment device comprises:
a first group of n flip-flops including digital signal inputs connected to said outputs of said series-parallel converter and respective outputs; a second group of n−1 flip-flops each having a digital signal input connected to said outputs of the first $(n-1)^{th}$ flip-flops of said first group, and respective outputs; n multiplexers each having a plurality of inputs and an output;
said outputs of said flip-flops of said first and second groups being connected to inputs of said multiplexers in such a manner that the output of the $m^{th}$ flip-flop is connected to respective $(m-n+p)^{th}$ inputs of the $p^{th}$ multiplexers, where p=n to n−(m−1) for the range $1 \leq m \leq n$ and p=1 to (2n−m) for the range $(n+1) \leq m \leq (2n-1)$; and
means for supplying address signals to said multiplexers in dependence on signals received from said synchronizing circuit so that said multiplexer can supply n possible signal combinations corresponding to the n possible phase positions.

* * * * *